United States Patent
Miller et al.

(10) Patent No.: US 9,042,281 B2
(45) Date of Patent: May 26, 2015

(54) METHOD AND APPARATUS FOR INITIALIZING AN RFID TAG VIA AN OPTICAL DISPLAY

(75) Inventors: Robert R. Miller, Convent Station, NJ (US); Lusheng Ji, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 529 days.

(21) Appl. No.: 12/963,414

(22) Filed: Dec. 8, 2010

(65) Prior Publication Data

US 2012/0147798 A1 Jun. 14, 2012

(51) Int. Cl.
*H04B 10/00* (2013.01)
*G06K 7/10* (2006.01)
*H04Q 9/00* (2006.01)
*G06K 1/18* (2006.01)
*H04L 29/06* (2006.01)
(Continued)

(52) U.S. Cl.
CPC .. *H04Q 9/00* (2013.01); *G06K 1/18* (2013.01); *G06K 7/10188* (2013.01); *G06K 7/1095* (2013.01); *H04B 5/0062* (2013.01); *H04L 63/0492* (2013.01); *H04W 8/26* (2013.01); *H04W 12/08* (2013.01); *H04W 48/16* (2013.01); *H04W 84/047* (2013.01); *H04W 88/02* (2013.01); *H04Q 2209/47* (2013.01); *H04Q 2209/43* (2013.01)

(58) Field of Classification Search
CPC .......... G06K 17/0022; G06K 7/10188; G06K 7/10195; G06K 19/0723; H04B 5/0062; H04L 63/0435; H04L 63/0492; H04L 2209/805; H04L 29/0809; H04L 67/02; H04W 12/04; H04W 88/06

USPC ................... 370/310, 329, 341, 431; 380/45; 340/572.1, 12.51–16.1, 5–16.11, 10.1, 340/10.52; 726/16–17, 27; 398/140–141
See application file for complete search history.

(56) References Cited

U.S. PATENT DOCUMENTS 5,898,801 A * 4/1999 Braun et al. ..................... 385/24
6,271,815 B1 * 8/2001 Yang et al. ...................... 345/82
(Continued)

FOREIGN PATENT DOCUMENTS

| JP | 2000-163524 | 6/2000 |
| JP | 2001-022905 | 1/2001 |

(Continued)

OTHER PUBLICATIONS

Extended European Search Report for 07122855.5, Feb. 4, 2010, consists of 6 pages.

(Continued)

*Primary Examiner* — Wutchung Chu (57) ABSTRACT

A method and apparatus for initializing a radio frequency identification tag are disclosed. For example, the method receives an optical signal having a unique identifier and an encryption key from a display by a radio frequency identification repeater associated with the radio frequency identification tag, wherein the radio frequency identification repeater comprises an optical reader. The method then transmits a communication comprising radio frequency identification information associated with the radio frequency identification tag and the unique identifier via the radio frequency identification repeater to a wireless access point, wherein the communication is encrypted using the encryption key.

14 Claims, 4 Drawing Sheets

(51) Int. Cl.
*H04W 12/08* (2009.01)
*H04B 5/00* (2006.01)
*H04W 8/26* (2009.01)
*H04W 48/16* (2009.01)
*H04W 84/04* (2009.01)
*H04W 88/02* (2009.01)

(56) References Cited

U.S. PATENT DOCUMENTS

| | | | |
|---|---|---|---|
| 6,995,673 B1* | 2/2006 | Osredkar et al. | 340/572.1 |
| 7,088,229 B2 | 8/2006 | Johnson | |
| 7,295,108 B2* | 11/2007 | Corrado et al. | 340/539.22 |
| 7,427,018 B2* | 9/2008 | Berkun | 235/380 |
| 7,570,167 B2* | 8/2009 | Fein et al. | 340/572.1 |
| 7,692,532 B2* | 4/2010 | Fischer et al. | 340/10.2 |
| 7,741,970 B2* | 6/2010 | Cunningham et al. | 340/572.1 |
| 7,750,810 B2* | 7/2010 | Ritter et al. | 340/572.1 |
| 8,238,828 B2* | 8/2012 | Chava | 455/41.2 |
| 2004/0175184 A1* | 9/2004 | Shikatani | 398/140 |
| 2005/0154872 A1* | 7/2005 | McGrew | 713/150 |
| 2005/0275531 A1 | 12/2005 | Johnson | |
| 2007/0069851 A1* | 3/2007 | Sung et al. | 340/5.1 |
| 2007/0171073 A1 | 7/2007 | Ariyoshi et al. | |
| 2008/0129457 A1* | 6/2008 | Ritter et al. | 340/10.1 |
| 2008/0150698 A1* | 6/2008 | Smith et al. | 340/10.4 |
| 2008/0204248 A1* | 8/2008 | Cam Winget et al. | 340/572.4 |
| 2008/0253202 A1* | 10/2008 | Yu et al. | 365/189.09 |
| 2008/0297311 A1* | 12/2008 | Wu | 340/10.1 |
| 2008/0309494 A1* | 12/2008 | Bahar | 340/572.7 |
| 2009/0136027 A1* | 5/2009 | Salowey et al. | 380/45 |
| 2009/0224045 A1* | 9/2009 | Toda et al. | 235/439 |
| 2009/0272799 A1* | 11/2009 | Skor et al. | 235/381 |
| 2010/0295878 A1* | 11/2010 | Mathea et al. | 345/690 |
| 2011/0049243 A1* | 3/2011 | Gong et al. | 235/462.48 |
| 2011/0116798 A1* | 5/2011 | Kai | 398/58 |
| 2011/0158653 A1* | 6/2011 | Mazed | 398/140 |
| 2012/0128367 A1* | 5/2012 | Yamada | 398/118 |

FOREIGN PATENT DOCUMENTS

| | | |
|---|---|---|
| JP | 2006-197202 | 7/2006 |
| JP | 2006-331069 | 12/2006 |

OTHER PUBLICATIONS

Examiner's Office Letter for JP Patent Application No. 2007-323222, Apr. 27, 2012, consists of 4 unnumbered pages.

English Translation of Japanese Examiner's Office Letter for Japanese Patent Application Serial No. 2007-323222, mailed May 7, 2012, consists of 4 unnumbered pages.

English Translation of Japanese Examiner's Refusal Decision for Japanese Patent Application Serial No. 2007-323222, mailed Feb. 5, 2013, pp. 1-2.

* cited by examiner

METHOD AND APPARATUS FOR INITIALIZING AN RFID TAG VIA AN OPTICAL DISPLAY

The present disclosure relates generally to Radio Frequency Identification (RFID) and, more particularly, to a method and apparatus for initializing an RFID tag via an optical display.

BACKGROUND

In an existing RFID network, an RFID tag is read by an RFID reader via an RFID reader antenna. The RFID tag must be in close proximity to the RFID reader antenna to retrieve data from the RFID tag, particularly if the RFID tag is passive (does not have a self-contained power source, e.g., a battery). Thus, if the RFID tag physically moves around in a large area, the tracking of the RFID tag potentially requires that a large number of RFID antennas be deployed in all the areas that the RFID tag traverses. The specialized RFID infrastructure that needs to be deployed in a large scale can be very expensive. Further, RFID tags may be associated with objects and/or people in order to provide monitoring and services. Often, the task of associating an RFID tag with an object or person to be tracked (i.e., initializing the RFID tag) is a time consuming and labor intensive process. In addition, the initialization usually requires manual entry at a location proximate to an RFID reader. However, RFID infrastructure is not widely deployed outside the business environment, e.g., in homes/residences.

SUMMARY

The present disclosure provides a method and apparatus for initializing a radio frequency identification tag. For example, the method receives an optical signal having a unique identifier and an encryption key from a display by a radio frequency identification repeater associated with the radio frequency identification tag, wherein the radio frequency identification repeater comprises an optical reader. The method then transmits a communication comprising radio frequency identification information associated with the radio frequency identification tag and the unique identifier via the radio frequency identification repeater to a wireless access point, wherein the communication is encrypted using the encryption key.

In an alternate embodiment, a method transmits an optical signal having a unique identifier and an encryption key to a display, and receives a communication comprising radio frequency identification information associated with the radio frequency identification tag and the unique identifier, wherein the communication is encrypted using the encryption key.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

As discussed above, if an RFID tag physically moves around in a large area, the tracking of the RFID tag potentially requires a large number of RFID antennas and readers to be deployed in all the areas that the RFID tag traverses. The specialized RFID infrastructure that needs to be deployed in a large scale can be very expensive. Furthermore, an entity having a deployed RFID network that desires to provide services involving RFID tags and RFID tagged objects outside the coverage area of the RFID network is not able to do so. If an RFID tag can be read using other existing wireless technologies, such as an Ethernet-like wireless Local Area Network such as IEEE 802.11 (Wi-Fi), a Personal Area Network such as UWB or ZigBee, a Metropolitan Area Network such as IEEE 802.16 (WiMAX), or cellular Wide-Area Network, the cost of deploying specialized RFID infrastructure can be minimized. In addition, services involving RFID tags and RFID tagged objects, such as initializing an RFID tag (e.g., by associating the RFID tag with an object or a person), can be extended outside the coverage area of the deployed RFID network.

To address this criticality, one embodiment of the present disclosure enables an RFID repeater to be used in conjunction with an RFID tag to allow information or data in the RFID tag to be read using existing wireless packet switched technologies. In one embodiment, an RFID repeater is installed over an RFID tag using a standard fastening material such as hook-and-loop fasteners (also known by the tradename, "Velcro" of Velcro Industries of the Netherlands). It should be noted other fasteners can also be used, e.g., detachable clips, snap on buttons, screws, and the like. The RFID repeater reads and records the data from the RFID tag and then transmits the retrieved data from the RFID tag over standard wireless packet network including, but not limited to, a Wi-Fi network, wireless Personal Area Network, Local Area Network, Metropolitan Area Network, and Wide-Area cellular network air interfaces.

It should be noted that Wi-Fi refers to the underlying technology of wireless Local Area Networks (WLANs) based on the IEEE 802.11 standard. UWB refers to a technology for transmitting information spread over a large bandwidth, such as larger than 500 MHz, which enables spectrum sharing among multiple users. ZigBee refers to low power digital radios based on the IEEE 802.15.4 standard for wireless Personal Area Networks (WPAN). WiMAX refers to networks based on the IEEE 802.16 Metropolitan Area Network standard. Cellular refers to a radio network made up of a number of radio cells where each radio cell is served by a cell site or base station.

In one embodiment, the RFID repeater comprises a short range RFID reader as well as a radio frequency modem device, which can further be used to provide identification, location, light, temperature, humidity, audio, and biological data. Once it has read the RFID tag to which it is attached, the embedded reader in the RFID repeater records the RFID tag data to conserve power and to avoid collisions from other RFID tags. It usually does not have to read the tag again, but can be commanded remotely to do so to verify that the repeater is still attached to its associated RFID tag, for example. The physical architecture positions the RFID tag in close and readable proximity to the RFID repeater, thus associating both the RFID and repeater with a reference object, such as a package, an object, or a person to be tracked. One embodiment of the present disclosure creates an integrated platform to extend the ability to associate RFID tag data with an object or person to environments outside the coverage of RFID infrastructure (e.g., outside the range of RFID readers of the relevant RFID network).

In particular, one embodiment provides a user with an RFID tag and an RFID repeater having a wireless transmitter and optical reader. A network based application residing on an RFID network management server is accessed remotely by the user using provided login credentials via a user device having a display screen. The user device may comprise, for example, a personal computer, a laptop computer, a cellular telephone, a smart phone, a wireless phone, a tablet, a television with a set-top box, and a personal data assistant. The network based application enables a display screen to provide an optical signal containing a unique identifier and an encryption key to the optical reader of the RFID repeater. Specifically, the user presents the optical reader to the display which is in communication with the network based application. The display, under the instructions of the network based application, provides the optical signal having a unique identifier and an encryption key to the optical reader. The optical signal may also provide instructions to the RFID repeater to upload information associated with the RFID tag. Upon receiving the optical signal, the RFID repeater transmits via the wireless transmitter the information contained in the RFID tag along with the unique identifier, and encrypts the transmission using the received encryption key. In one embodiment, the wireless transmission is sent to a wireless access point which forwards the information to the network based application. The network based application begins the initialization of the RFID tag by storing an association between the RFID tag and the identifier. In addition, the network based application provides further access to a secure portion of the network based application through which the RFID tag is further initialized. It should be noted that the RFID tag itself may contain only a single piece of information comprising a serial number. Thus, all other data pertaining to the RFID tag may be maintained separately (e.g., in a database association the RFID tag information/serial number with the additional data).

The following example provides only an illustrative scenario in which the initialization of an RFID tag at a remote location using an optical signal on a display of a user device may be implemented advantageously in an RFID network environment. For example, an office building owner may use an RFID network having a management server, RFID readers and RFID tags to provide security and to track the movement of people who visit and work in the building. Workers who enter and leave the building on a regular basis, such as full time employees of a building tenant may be given permanent RFID tags. Each RFID tag may contain information, such as a tag serial number, which is readable by an RFID reader when the RFID tag is in proximity to the RFID reader. The RFID network may include a management server which stores associations between the RFID tags and data pertinent to the employee. For instance, the stored data may include the employee's name, company, regular hours, the floor(s) and/or zone(s) of the building in which the employee is permitted to enter, the elevator bank(s) which the employee is permitted to use, job title, physical descriptions of the employee, images of the employee (e.g., a photo identification), and similar information. In one embodiment, the building may be a "smart building" having automated control over such things as building access, elevator access, access to particular floors, entry into restricted zones, and opening of controlled doorways. The "smart building" may have such further functions as tracking of workers movements and locations within the building.

The RFID network deployed in the building supports such functions as described herein. For example, RFID readers deployed throughout the building may read the RFID tags of employees/workers entering, leaving and utilizing the building and may forward the RFID tag information to the RFID network management server. As an example, the management server may look-up the data stored in connection with the RFID tag, such as authorization data, to determine whether the worker is permitted to enter a doorway proximate to the RFID reader. The same or a similar procedure may be used to determine whether a worker is authorized to enter a particular elevator or to exit the elevator at a particular floor.

Alternatively, or in addition, RFID tags associated with various workers may be scanned by a number or RFID readers deployed throughout the building whenever the RFID tag comes within range of a particular RFID reader. The whereabouts of an RFID tag, and hence a worker associated with the RFID tag, may be continuously or periodically monitored and the current and past locations of the RFID tag maintained in a database associated with the RFID management server. This allows management or security personnel to know the present and/or past locations of various workers throughout the building.

On the other hand, visitors to the building may be provided temporary RFID tags in order to allow the visitors to access the building, while permitting the building owner to provide relevant services and maintain an appropriate level of security. By way of example, a building tenant may invite a visitor to a conference in the building in advance of the scheduled date. One way in which to provide the visitor with access to the building is to have the visitor stop at a security check point upon first entering the building at a main entrance. The tenant who invited the visitor may notify the security personnel in advance of this particular visitor. In addition, the inviting tenant may indicate an approximate arrival time in addition to a location in the building where the visitor is expected for the scheduled appointment. Upon the visitor arriving at the security point, security personnel may request that the visitor provide identification, such as a driver's license, passport, or other photo ID, which the security personnel may verify with the visitor information provided by the inviting tenant. The security personnel may then enter certain information relating to the visitor into the database of the RFID management system (e.g., via a session on computer workstation or other device providing a connection to an RFID network management server). For example, the security personnel may enter personal information such as the visitor's name and driver's license number, along with building security and access information. The building security and access information may indicate such things as permitted areas of the building, the company and name of the tenant to be visited, and/or an expiration time pertaining to the access to the building.

Thereafter, the security personnel may associate an RFID tag with the entered information. For instance, upon completing entry of the relevant information, the security personnel may be prompted to scan an uninitialized RFID tag (i.e., an RFID tag that is not yet assigned to any person or object to be tracked) with an RFID scanner attached to the workstation. The scanned RFID tag information is forwarded to the RFID management server which includes a database storing an association between the RFID tag and the entered information. This completes the initialization process for the RFID tag. The RFID tag may then be provided to the visitor which permits the visitor to access designated areas of the building in the same manner as a regular worker.

However, the above scenario is labor intensive, and requires that security personnel be engaged in the task of initializing RFID tags, instead of performing other more valuable activities. In addition, it requires additional time from visitors to wait while information is populated into the database and the RFID tag is initialized. Accordingly, one embodiment of the present disclosure allows the initialization of the RFID tag to take place remotely (i.e., at a location removed from the RFID network and without its own RFID infrastructure). For example, a visitor may be provided an RFID tag in advance, along with a login and a password to use in accessing a secure network based application. By way of example, a tenant of the building may be hosting a relatively large conference with many anticipated visitors. The tenant may obtain a number of uninitialized RFID tags. Alternatively, or in addition, the RFID tags may be partially pre-initialized. For example, the tenant may notify the building owner that 100 visitors will be visiting conference room A on December 10 from 10:00 am to 4:00 pm. The building owner (e.g., the security personnel or other designee of the building owner) may obtain 100 unassigned (i.e., uninitialized) RFID tags. Each of the tags is associated with limited building security and access information which would only permit access to the appropriate portions of the building to reach conference room A at the designated date and times. The RFID tags may then be given to the tenant who sends or otherwise distributes the RFID tags to each of the visitors.

Upon receiving the RFID tags, each of the visitors may access an initialization portion of a network based application. The network based application then guides a visitor/invitee through a process in order to further complete the initialization of the particular RFID tag. For instance, each of the visitors may be provided an RFID tag, an RFID repeater with a wireless transmitter and an optical reader, and login credentials in order to access the initialization procedure. The initialization procedure may be accessed via a user device, such as a personal computer, a cellular phone, a smart phone, a tablet, or similar device, by invoking a web session or similar mechanism to connect to the network based application. Each of the visitors is given login credentials which may be common login credentials used by all of the visitors or may be individualized. Upon providing the login credentials, the network based application retrieves or creates a unique identifier and an encryption key, and prompts the visitor to place the optical reader of the RFID repeater near a designated location, e.g., on a display screen of the user device. In one embodiment, the unique identifier may comprise, for example, a signature key associated with the login credentials.

In one embodiment, the network based application causes the user device to display an optical signal which contains the unique identifier and an encryption key via the display of the user device. The optical signal further includes instructions to the RFID repeater to upload RFID tag information along with the unique identifier. The RFID repeater decodes the instructions which cause the RFID repeater to transmit the RFID tag information along with the unique identifier to an access point of a local area network. Specifically, the RFID repeater includes a wireless transmitter for wireless communication (e.g., Wi-Fi, ZigBee, etc.) to a wireless access point. The access point forwards the transmission to the network based application (via one or more data networks such as a local area network and a public data network). The transmission is encrypted by the RFID repeater using the obtained encryption key.

Upon receiving the RFID tag information along with the unique identifier via the wireless access point, the network based application provides access to a secure portion of the network based application where the visitor is prompted to provide (e.g., via the user device) further information required to complete initialization of the RFID tag. For instance, the visitor may be required to provide a name and driver's license number to be further correlated with the RFID tag information in order to complete the initialization of the RFID tag. If the visitor does not provide the required information, the initialization of the RFID tag may not be completed and the RFID tag may not be operable to obtain access the building at the designated date and/or times. This provides a certain level of security insofar as the tenant is expected to mail the RFID tags to its visitors (who are presumed to be trusted by the tenant). Further, the building owner is notified in advance of the conference and provides RFID tags which are limited to providing access only to the portions of the building necessary to serve the purpose of the visit. In addition, the visitor is required to provide a certain amount of personal information in order to activate the RFID tag. The tag may not be used for building access until such time as the visitor completes the initialization of the tag by providing the required personal information.

While still providing a measure of security, this embodiment allows the visitor and the building owner to save time and resources by not requiring that the visitor and the security personnel complete the initialization of the RFID tag in-person when the visitor arrives at the building. This is particularly useful when a large number of visitors/invitees are expected to arrive at the same time and may overwhelm the building personnel. When the RFID tag is initialized as described, the RFID tag may be used in the same manner as the RFID tag of a full-time employee working in the building, including the monitoring of the whereabouts of the visitor using the tag.

In one scenario, an RFID reader at a building entrance may scan an RFID tag of a visitor approaching the building. The information is relayed by the RFID reader to the RFID management server. The RFID management server may be configured to determine that the visitor is approaching the building entrance and to provide a notification to building personnel at the building entrance that a visitor is approaching. The notification may provide further information about the visitor including his or her name, the purpose of the visit and the intended destination in the building (e.g., conference room A). Thus, the building personnel may personally greet the visitor by name and may give the visitor directions for reaching conference room A, without any prompting by the visitor.

Although an embodiment has been described involving the use of RFID tags in a commercial building to provide security and monitoring of visitors, it should be understood that the foregoing is discussed by way of example only, and that the present disclosure is not limited to such an embodiment. Specifically, the initialization of RFID tags in remote locations using an optical signal via a display of a user device may be used in numerous other applications. For example, a tour group visiting a large art museum may have a limited amount of time and cannot possibly experience the entire collection. However, each visitor in the group may be provided an RFID tag in advance of the trip and may initialize the tags to include information on the visitor's favorite period or style of art. Upon visiting the museum, the visitor may be automatically directed to the areas of greatest interest to the visitor. For example, the museum may deploy an "electronic concierge" with one or more RFID scanners to scan RFID tags. Upon scanning an RFID tag, the "electronic concierge" may retrieve a visitor's preferences stored in association with the RFID tag information (e.g., in a database associated with an RFID network management server) and may direct the visitor based upon the retrieved information.

Figure 1:
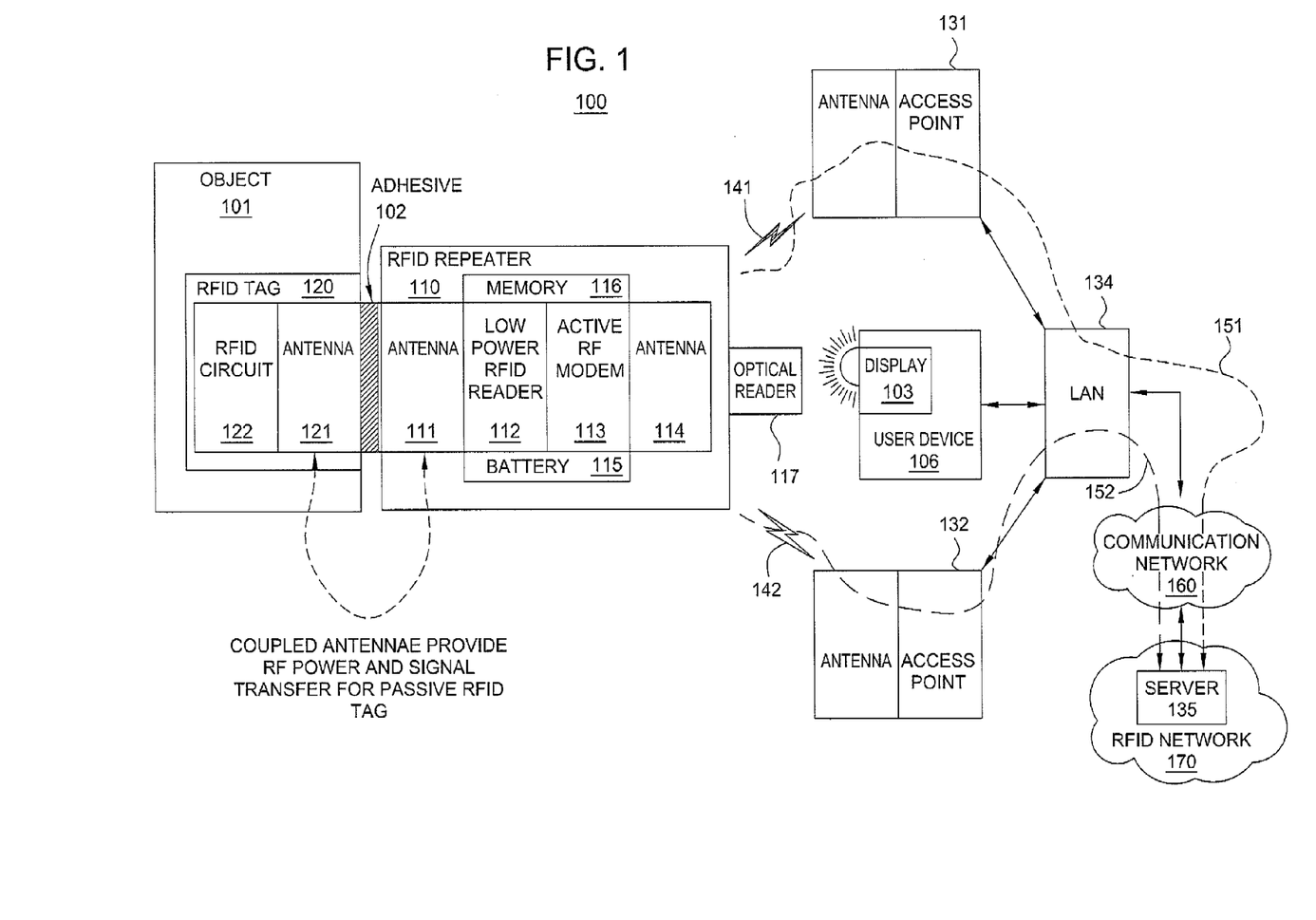
FIG. 1 illustrates an exemplary RFID repeater and associated wireless networks.

FIG. 1 illustrates an exemplary RFID repeater and the associated wireless networks of the present disclosure which provide a suitable environment for enabling the remote initialization of an RFID tag via an optical signal presented on a display screen. In FIG. 1, RFID tag 120, comprising an antenna 121 and an RFID circuit 122, is associated with an object (or an individual) 101 that is to be tracked or served by a network based application residing on server 135. In one embodiment, RFID tag 120 and RFID repeater 110 are adhered to each other using an adhesive material or device 102. Thus, the RFID repeater 110 can be selectively attached or detached from the RFID tag 120. The ability of the RFID repeater to be selectively attached to an RFID tag allows a particular object or individual to be tracked, e.g., when outside the range of RFID readers of the relevant RFID network. Note that RFID tag 120 can be a passive or an active RFID tag.

In one embodiment, RFID repeater 110 comprises an antenna 111 (e.g., a first antenna), a low power RFID reader 112 (broadly implemented having a processor), an active RF modem 113, antenna 114 (e.g., a second antenna), a battery 115, a memory 116 and an optical reader 117. RFID repeater 110 is powered by the battery 115. If the RFID tag 120 is a passive tag, antenna 111 and antenna 121 are used to provide power and signal transfer between RFID tag 120 and RFID repeater 110. In particular, low power RFID reader 112 can use antenna 111 to send power (e.g., a signal) to RFID 120 via antenna 121 and retrieve the data embedded in RFID circuit 122 to be stored in the memory 116 of the RFID repeater 110. Once the data embedded in the RFID tag 120 has been read by the RFID reader 112, RFID reader 112 is deactivated to conserve the power of battery 115. The data retrieved from RFID tag 120 can then be communicated to a server 135 hosting a network based application using active RF modem 113 via standard wireless packet protocols. For example, active RF modem 113 in RFID repeater 110 may use antenna 114 to communicate with access points 131 and 132 via wireless links 141 and 142 respectively.

For example, if the RFID repeater 110 is in an area covered by access point 131, wireless link 141 is used to provide wireless access between RFID repeater 110 and access point 131. If the RFID repeater 110 is in an area covered by access point 132, wireless link 142 is used to provide wireless access between RFID repeater 110 and access point 132.

Note further that, in one embodiment, access points 131 and 132 are connected to Local Area Network (LAN) 134 which in turn is connected to the server 135 hosting the network based application. LAN 134 can employ wired or wireless LAN technologies. Data read from memory 116 residing in RFID repeater 110, via active RE modem 113 and antenna 114, is communicated to the network based application residing on server 135 using flows 151 or 152, depending on the actual location of RFID repeater 110. The wireless packet access protocols used between RFID repeater 110 and the access points 131 and 132 include, but are not limited to, UWB, ZigBee, Wi-Fi, and cellular protocols. In addition to providing data retrieved from RFID 120, RFID repeater 110 can provide additional data including, but not limited to, identification, location, light, temperature, humidity, audio, and biological data.

As mentioned above, the arrangement of FIG. 1 may provide a suitable environment for initializing an RFID tagged object, such as object 101, in a location without a dedicated RFID infrastructure. In one embodiment, a user device 106 having a display 103 is connected (wired or wirelessly) to the local area network 134. As mentioned above, the local area network is connected to wireless access points 131 and 132 that are in communication with RFID repeater 110. The user device 106 may be used by a user to access an initialization portion of the network based application residing on server 135. For example, the user device 106 may include a web browser or other means for invoking a connection over LAN 134 and a communication network 160 (e.g., the Internet) to the network based application residing on server 135 of the RFID network 170. In response, the network based application may be configured to retrieve or create a unique identifier and an encryption key to be associated with an RFID tag. In addition, the network based application on server 135 may be configured to transmit instructions to the user device 106 which cause the user device to display on a portion of display 103 an optical signal containing the unique identifier and the encryption key along with further instructions intended for an RFID repeater, such as RFID repeater 110.

If a user places the optical reader 117 of RFID repeater 110 in proximity to the portion of display 103 displaying the optical signal, the instructions, unique identifier and the encryption key may be downloaded into memory 116. The operating system, a software application, hardware or a combination of software and hardware residing in memory 116 may enable RFID repeater 110 to interpret, execute and issue basic instructions necessary for performing the tasks described herein. Specifically, the RFID repeater 110 may decode the instructions which command the RFID repeater to transmit back to the network based application via active RF modem 113 and antenna 114 the information contained in the RFID tag 120 along with the unique identifier, and to encrypt the transmission using the received encryption key. The wireless transmission may be received by wireless access point 131 or 132 over wireless link 141 or 142, respectively. Access point 131 or 132 may then forward the communication to the network based application residing on server 135 in the RFID network 170. This allows the network based application to receive the necessary information in a secure manner in order to begin the initialization of the RFID tag 120 by storing an association between the RFID tag 120 and the unique identifier. Thereafter, the network based application residing on server 135 may provide further access to a secure portion of the network based application through which the RFID tag 120 is further initialized. For example, a user may be permitted via user device 106 to provide additional information (e.g., user name, company name, job title, user preference, user interest, user food preference, user contact information, and so on) via a web-based form to the network based application to be further associated with the RFID tag 120. The additional information provided via user device 106 may also be encrypted using the same encryption key earlier sent by the network based application.

After the additional information is received and stored by the network based application residing on server 135, the RFID tag 120 is considered initialized and may be used or tracked in RFID network 170, just as if the RFID tag were initialized in a conventional manner (i.e., from within the RFID network using an RFID scanner).

Figure 2:
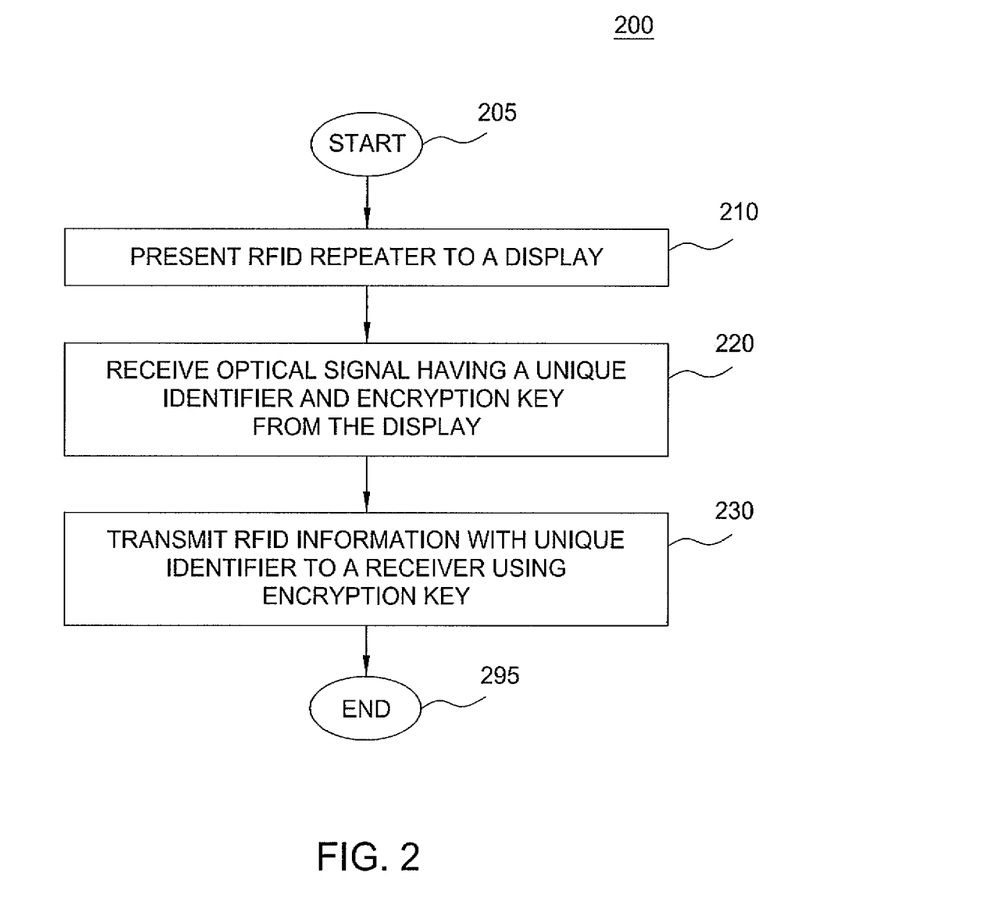
FIG. 2 illustrates a flowchart of a method for initializing an RFID tag through a network based application using an optical signal presented on a display.

FIG. 2 illustrates a flowchart of a method 200 for initializing an RFID tag. In particular, the method 200 initializes an RFID tag with an RFID network through a secure network based application which causes an optical signal to be presented on a display of a user device. Method 200 starts in step 205 and proceeds to step 210.

In step 210, the method presents an RFID repeater to a display. For example, the RFID repeater is attached to the RFID tag using an adhesive material such as Velcro or other appropriate adhesive medium. The RFID tag can be a passive or an active tag. In one embodiment, the RFID repeater retrieves the data embedded in the RFID tag using an intermittently-activated low power RFID reader. If the RFID tag is a passive tag, the RFID repeater powers the RFID tag (e.g., via a communication signal) via the antennae arrangement of the two attached devices. The data read by the RFID repeater is stored in the RFID repeater for later use. Thus, in one embodiment the low power RFID reader embedded in the RFID repeater may be deactivated to conserve battery power in the RFID repeater.

In one embodiment, the RFID repeater further comprises an optical reader, or photocell, configured to receive optical signals, e.g., from a display. For example, a user remote from the RFID network may be given the RFID tag and the RFID repeater with an attached or embedded photocell. In addition, the user may be provided login credentials in order to access an initialization process associated with the secure network based application residing on a server coupled to the RFID network. The secure application may comprise a database storing associations between RFID tag information, unique identifiers and encryption keys provided by the network based application to RFID tags, as described below. The database may further store associations between the RFID tags, unique identifiers, and information entered by a user, e.g., via a web session.

For example, the user may invoke the initialization portion of the network based application by navigating to a webpage, e.g., via a web application residing on a user device, or by initiating a similar connection between the user device and the network based application. When prompted by the network based application, the user enters the provided login credentials via the user device. Upon receipt of the login credentials, the network based application retrieves or creates a unique identifier to associate with the RFID tag, and an encryption key to be used in later communication from the RFID repeater.

In step 220, the method receives an optical signal having the unique identifier and the encryption key from the display. For example, the network based application may provide instructions to the user device which causes the display to depict an intensity modulated signal on a portion of a screen. The intensity modulated signal encodes information comprising the unique identifier and the encryption key retrieved by the network based application. For example, the network based application can cause the display to depict a white square on the screen with a time varying intensity at a maximum rate up to the refresh rate of the display. In one embodiment, the display may present the signal within a webpage window (or other application windows depending upon the particular user device) appearing on all or a portion of the display screen of the user device. Thus, a low speed optical intensity modulated data stream can be received by the optical receiver of the RFID repeater and decoded.

Although one embodiment causes a white square to be displayed on the display screen of the user device, it should be noted that other similar configurations (e.g., different color, different shapes, different patterns, and etc.) may provide the same functionality and that such other embodiments are equally within the scope of present disclosure. For example, a circular, a triangular or other geometric configuration may be used. In addition, the intensity modulated signal may be provided via another color displayed on the user device display. For instance, blue, yellow, or even a combination of colors may be used.

In one embodiment, it is contemplated that the optical signal is an on-off intensity modulated signal where only two intensities (i.e., "on" at some positive level of intensity on the display, and "off" or black/zero intensity) are used to convey the data stream. In an alternative embodiment, a multi-level intensity coding scheme is used. For example, progressively higher data rates may be achieved by using three intensity levels (e.g., off, low, high), four intensity levels (e.g., off, low, medium, high), and so forth. The feasibility of such multi-level encoding schemes is limited only by current capabilities of standard display screens and optical receivers (e.g., photocells). For example, most displays have a refresh rate of 60 Hz up to 120 Hz, while some newer liquid crystal displays have refresh rates as high as 240 Hz, potentially limiting the rate of data transfer. The present disclosure contemplates that more advanced multi-level encoding schemes may be used as the pertinent display technology progresses. In any event, when using multi-level intensity modulation versus on-off modulation, greater maximum intensity levels on the display side may be required. Additionally, or in the alternative, a shorter distance between the optical receiver and the transmitting display screen is likely to be required in order for the optical signal to be correctly received by the optical receiver.

As mentioned, the intensity modulated signal may comprise a unique identifier and an encryption key. The optical intensity modulated signal may further comprise instructions which cause the RFID repeater to download the unique identifier and encryption key (e.g., to a memory of the RFID repeater). In addition, the optical intensity modulated signal may comprise instructions to the RFID repeater to wirelessly transmit a responsive communication containing the tag information associated with the attached RFID tag, along with the unique identifier, and to encode the wireless transmission using the encryption key. To enable such functionality, the memory of the RFID repeater may comprise an operating system, a software application, hardware and/or a combination of software and hardware, which is capable of receiving and creating instructions necessary to perform the limited functions described herein.

In step 230, the method initiates encrypted communication of the retrieved RFID tag information and the unique identifier from the RFID repeater to the network based application residing on the server using standard wireless packet access protocols via a wireless access point or base station. For example, the method may invoke communication between the RFID repeater and the wireless access point using ultra-wideband (UWB) communication, ZigBee, Wi-Fi, cellular, or the like via a wireless transmitter of the RFID repeater. The network based application may then store an association between the RFID tag information, and the unique identifier sent to the RFID repeater via the optical intensity modulated signal. In addition, the network based application may provide access to a secure portion of the network based application upon receipt of the encrypted communication. For example, the user may be authorized to securely provide, via the user device, additional information to the secure application to be further associated with the RFID tag information and the identifier. The method ends in step 295.

Figure 3:
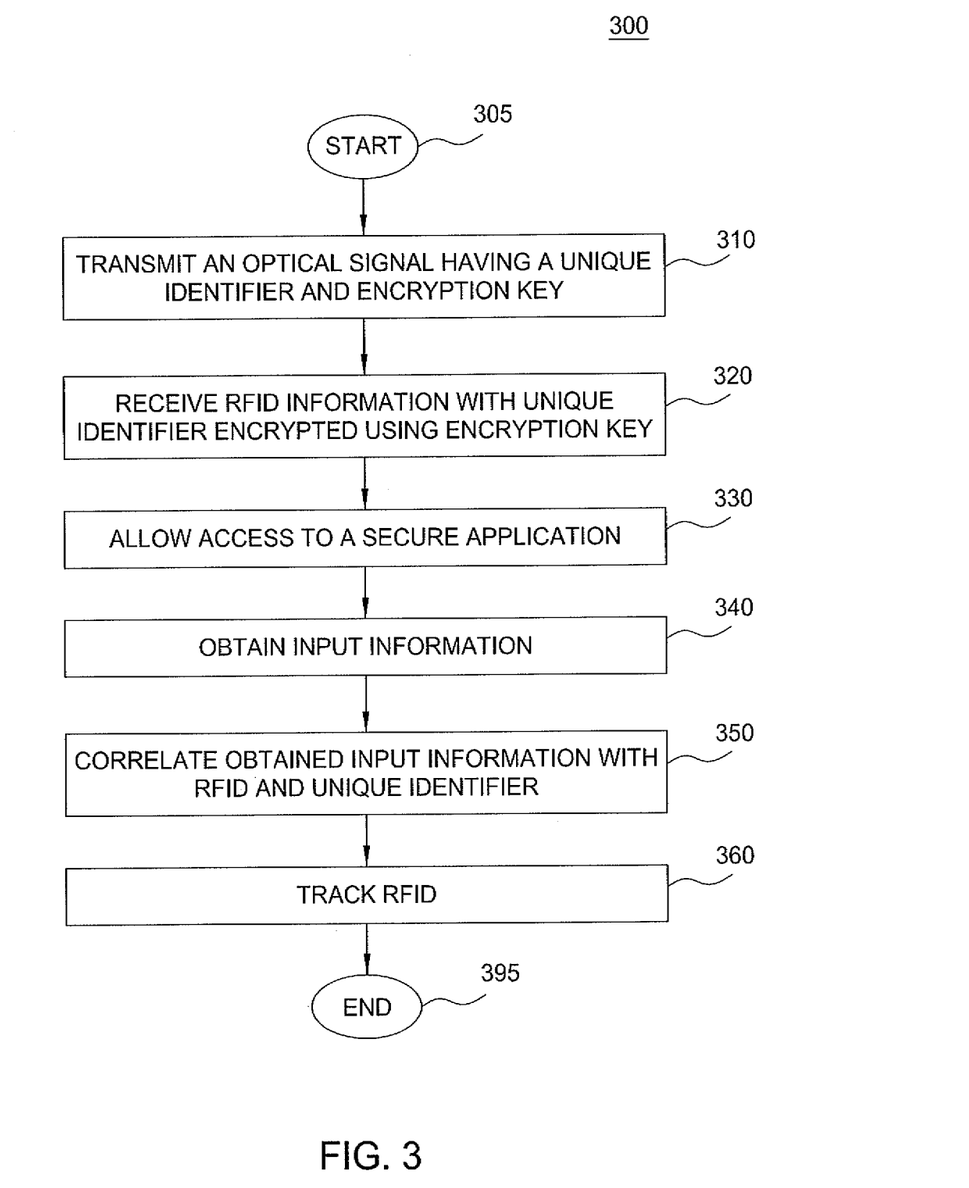
FIG. 3 illustrates a flowchart of a method for initializing an RFID tag by providing a unique identifier to an RFID tag via an optical signal on a display and correlating the unique identifier to the RFID tag information.

FIG. 3 depicts a flowchart of a method 300 for initializing an RFID tag. In particular, the method 300 provides a unique identifier to an RFID tag and correlates the unique identifier to the RFID tag information and other information provided by a user. Method 300 starts in step 305 and proceeds to step 310.

In step 310, the method 300 transmits an optical signal having a unique identifier and an encryption key. For example, a user remote from an RFID network may be provided with an RFID tag and an RFID repeater with an attached or embedded optical reader, or photocell. In addition, the user may be provided login credentials in order to access an initialization procedure of a secure network based application residing on a server coupled to the RFID network. The user may invoke the initialization procedure by navigating to a webpage or initiating a similar connection between a user device and the network based application. When prompted by the network based application, the user may enter the provided login credentials via the user device. Upon receipt of the login credentials, the method may create or retrieve a unique identifier to associate with the RFID tag and an encryption key to be used in later communication from the RFID repeater.

Thereafter, the method may forward instructions, the unique identifier and the encryption key to the user device, the instructions causing the display of the user device to display an optical signal containing the unique identifier, encryption key, and/or further instructions for an RFID repeater receiving the optical signal. In one embodiment, the optical signal may be presented as an intensity modulated signal appearing in a white square visible on a portion of the screen of the display.

The RFID repeater receives the optical intensity modulated signal from the display, via the attached or integrated optical receiver. The RFID repeater then decodes the instructions, the unique identifier and the encryption key. In one embodiment, the instructions, when decoded by the RFID repeater, cause the RFID repeater to wirelessly transmit an encrypted communication of the retrieved RFID tag information and the unique identifier to the network based application residing on the server using standard wireless packet access protocols via a wireless access point or base station.

Thus, in step 320, method 300 receives the encrypted communication of the retrieved RFID tag information and the unique identifier at the network based application, where the encrypted communication is encrypted with the encryption key. For example, the communication between the RFID repeater and the wireless access point may utilize ultra-wideband (UWB) communication, ZigBee, Wi-Fi, cellular, or the like via a wireless transmitter of the RFID repeater. In addition, the communication may be encrypted using the encryption key provided to the RFID repeater via the optical intensity modulated signal.

In step 330, the method 300 allows access to a secure portion of the network based application. For example, the method receives an encrypted communication from the RFID repeater comprising the RFID tag information from the associated RFID tag along with the unique identifier. The method then stores an association between the unique identifier and the RFID tag information in a database residing on the server. In addition, the method authorizes the user device to access a secure part of the network based application upon receiving back the unique identifier and the RFID tag information.

In step 340, the method obtains further input information. For instance, the method permits the user, via the user device, to enter further information to be associated with the RFID tag information and the unique identifier. For example, the user may provide a name, birthday, address, and similar personal identifying information.

In step 350, the method correlates the obtained input information with the RFID tag and the unique identifier. For example, the method may receive and store the additional input information in association with the RFID tag information previously obtained. At this point, the RFID tag may be considered initialized. This additional information stored by the method can then be used to provide additional monitoring and services when the RFID tag (and user) enters the RFID network space.

In step 360, the method tracks the RFID tag. For example, when the RFID tag enters the RFID network space, the method may track the RFID tag and provide services to the user carrying the RFID tag, just as if the RFID tag were initialized in a conventional manner (i.e., from within the RFID network using an RFID scanner). The method ends in step 395.

It should be noted that the steps of the methods 200 and 300 may be performed by any one or more of the components of the system 100 depicted in FIG. 1. For example, one or more steps of the method 200 may be implemented by the RFID repeater 110. In addition, one or more of the steps of the method 300 may be performed by server 135 hosting a network based application. In another embodiment, one or more steps of the method 300 may be performed by user device 106, or user device 106 in conjunction with server 135, for example. Alternatively, or in addition, one or more steps of the methods 200 or 300 may be implemented by a general purpose computer having a processor, a memory and input/output devices as illustrated below in FIG. 4.

In addition, although not expressly specified above, one or more steps of methods 200 and 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIGS. 2 and 3 that recite a determining operation or involve a decision do not necessarily require that both branches of the determining operation be practiced. In other words, one of the branches of the determining operation can be deemed as an optional step.

Figure 4:
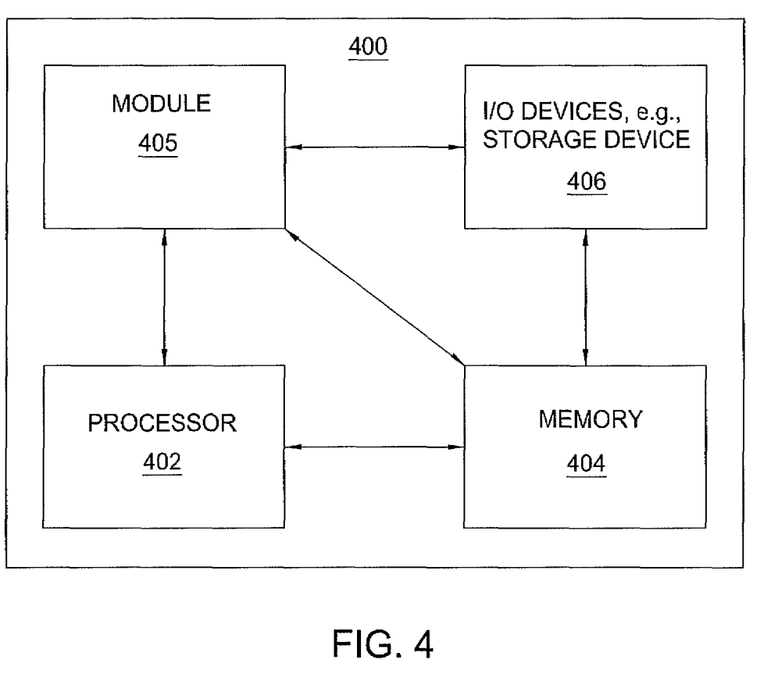
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for initializing a radio frequency identification tag, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that embodiments of the present disclosure can be implemented in software and/or in a combination of software and hardware, e.g., using application specific integrated circuits (ASIC), a general purpose computer or any other hardware equivalents. In one embodiment, the present module or process 405 for initializing a radio frequency identification tag can be loaded into memory 404 and executed by processor 402 to implement the functions as discussed above. As such, the present process 405 for initializing a radio frequency identification tag (including associated data structures) of the present invention can be stored on a non-transitory (e.g., physical or tangible) computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving an optical signal having a unique identifier and an encryption key from a display screen by a radio frequency identification repeater associated with a radio frequency identification tag, wherein the radio frequency identification repeater comprises an optical reader, wherein the optical signal is displayed on the display screen, and wherein the optical signal is received by the radio frequency identification repeater via the optical reader, wherein the optical signal comprises an intensity modulated signal, wherein the intensity modulated signal is encoded by a multi-level intensity modulation, wherein the optical signal is provided by a network-based server to the display screen; and
transmitting a communication comprising radio frequency identification information associated with the radio frequency identification tag and the unique identifier via the radio frequency identification repeater to the network-based server via a wireless access point, wherein the communication is encrypted using the encryption key, wherein the wireless access point is coupled to a local area network that is providing an access to the network-based server, wherein an access to a secure application residing on the network-based server is granted to a user device as a result of the transmitting the radio frequency identification information and the unique identifier.

2. The method of claim 1, wherein the transmitting via the wireless access point employs a Wi-Fi protocol.

3. The method of claim 1, wherein the transmitting via the wireless access point employs an ultra wideband protocol.

4. The method of claim 1, wherein the transmitting via the wireless access point employs a cellular protocol.

5. The method of claim 1, wherein the transmitting via the wireless access point employs a Zigbee protocol.

6. The method of claim 1, further comprising:
receiving the radio frequency identification information and the unique identifier at the network-based server;
storing an association between the radio frequency identification information and the unique identifier at the network-based server; and
authorizing the access by the user device to the secure application residing on the network-based server.

7. The method of claim 6, further comprising:
storing an association between additional input information that is received from the user device and the radio frequency identification information.

8. A non-transitory computer-readable medium storing instructions which, when executed by a processor of a radio frequency identification repeater, cause the processor to perform operations, the operations comprising:
receiving an optical signal having a unique identifier and an encryption key from a display screen by the radio frequency identification repeater associated with a radio frequency identification tag, wherein the radio frequency identification repeater comprises an optical reader, wherein the optical signal is displayed on the display screen, and wherein the optical signal is received by the radio frequency identification reader via the optical reader, wherein the optical signal comprises an intensity modulated signal, wherein the intensity modulated signal is encoded by a multi-level intensity modulation, wherein the optical signal is provided by a network-based server to the display screen; and
transmitting a communication comprising radio frequency identification information associated with the radio frequency identification tag and the unique identifier via the radio frequency identification repeater to the network-based server via a wireless access point, wherein the communication is encrypted using the encryption key, wherein the wireless access point is coupled to a local area network that is providing an access to the network-based server, wherein an access to a secure application residing on the network-based server is granted to a user device as a result of the transmitting the radio frequency identification information and the unique identifier.

9. A method, comprising:
transmitting, by a processor of a network-based server, an optical signal having a unique identifier and an encryption key to a display screen, wherein the optical signal is to be displayed on the display screen, wherein the optical signal comprises an intensity modulated signal, wherein the intensity modulated signal is encoded by a multi-level intensity modulation;
receiving, by the processor, a communication comprising radio frequency identification information associated with a radio frequency identification tag and the unique identifier, wherein the communication is encrypted using the encryption key, wherein the communication is received from a radio frequency identification repeater via a wireless access point, wherein the radio frequency identification repeater comprises an optical reader, wherein the optical signal is received by the radio frequency identification repeater from the display screen via the optical reader, wherein the wireless access point is coupled to a local area network that is providing an access to the network-based server; and
authorizing, by the processor, an access by a user device to a secure application residing on the network-based server as a result of the receiving the radio frequency identification information and the unique identifier.

10. The method of claim 9, wherein the communication is received via a Wi-Fi protocol.

11. The method of claim 9, wherein the communication is received via an ultra wideband protocol.

12. The method of claim 9, wherein the communication is received via a cellular protocol.

13. The method of claim 9, wherein the communication is received via a Zigbee protocol.

14. The method of claim 9, further comprising:
storing an association between the radio frequency identification information and the unique identifier at the network-based server.

* * * * *